E. T. GREENFIELD.
JUNCTION BOX.
APPLICATION FILED JAN. 16, 1909.

975,032.

Patented Nov. 8, 1910.

WITNESSES:

INVENTOR

BY
ATTORNEY

UNITED STATES PATENT OFFICE.

EDWIN T. GREENFIELD, OF KIAMESHA, NEW YORK.

JUNCTION-BOX.

975,032.  Specification of Letters Patent.  Patented Nov. 8, 1910.

Application filed January 16, 1909. Serial No. 472,582.

*To all whom it may concern:*

Be it known that I, EDWIN T. GREENFIELD, a citizen of the United States, residing at Kiamesha, in the county of Sullivan and State of New York, have invented a certain new and useful Improvement in Junction-Boxes, of which the following is a specification.

This invention relates to junction-boxes of the type employed in installing electric lighting appliances in buildings.

More particularly, the invention concerns the provision of means for securing the end of a conductor entering an opening in the box to the latter so that though subjected to severe strains this conductor will not be pulled away from the box.

Junction-boxes as now commonly made are provided with openings through which the ends of conductors are passed for making connection within the box to an electric lighting device. It is important that these conductors be secured firmly to the box and it has heretofore been common to provide screws in threaded openings in the boxes, the ends of which screws would engage the conductors or the armoring thereon in order to clamp the conductors to the boxes. This method of securing the conductors to the box has not been satisfactory, however, as screws so disposed are apt to turn slightly in their threaded openings in the box and the ends of such screws wear off, resulting in a loosening of the grip of the screws upon the conductors.

My present invention involves the provision of an improved form of securing means in which the objections above noted are not present. A screw extending through a threaded opening in the box is employed, but this screw is so disposed that its side engages the conductor. Preferably the screw is case-hardened so that the threads thereof will cut into the armoring of the conductor somewhat and will not be turned over by contact with the armoring. The junction-box is provided with a threaded opening for the screw adjacent to the opening for the conductor and slightly inclined with relation thereto so that when the screw is inserted it extends across the conductor, its side engages the armoring of the conductor and a wedging action takes place as a result of which the conductor is firmly gripped and held to the box.

The preferred embodiment of the invention is illustrated in the accompanying drawings, in which—

Figure 1:
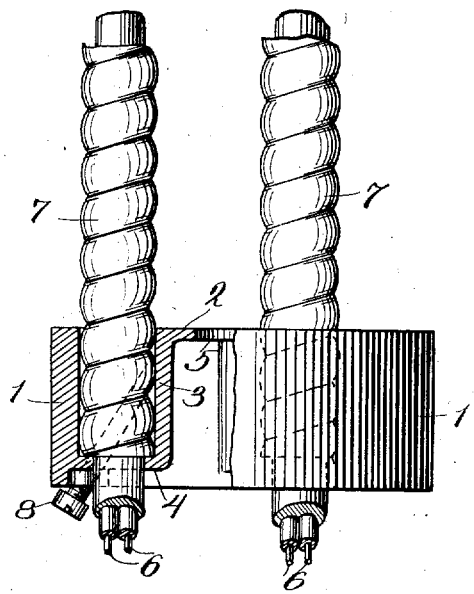
Figure 2:
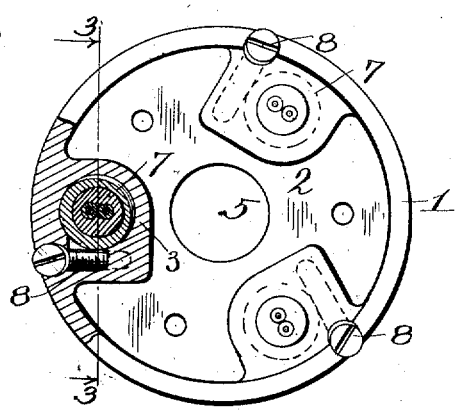
Figure 3:
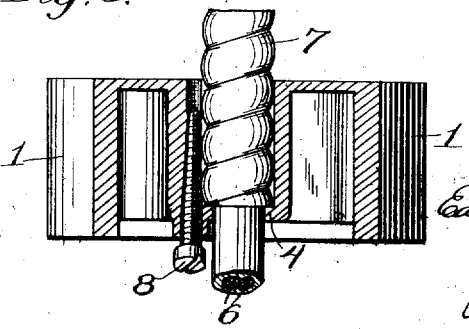
Figure 3:
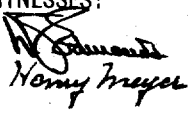
Figure 3:
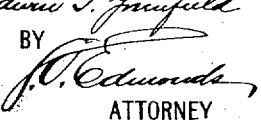

Figure 1 is a vertical section partly in elevation of the box showing the end of a conductor entering the same, Fig. 2 is a bottom view, partly in section, and Fig. 3 is a vertical section on line 3—3 of Fig. 2.

In the drawings, I have illustrated a ceiling box of cylindrical form, but it will be understood that the invention is equally applicable to wall boxes made of sheet-metal instead of castings and having openings in the side walls thereof as well as in the bottom. The box illustrated is a casting, consisting of a cylindrical wall 1 and an end wall 2, and the metal is formed, as at 3, to provide any desired number of tubular openings passing through the end wall 2 of the box. At the end of each of these tubular openings, an inwardly extending flange 4 is provided. At the center of the end wall 2 is an opening 5 for the reception of a gas-pipe or other device to which the box may be attached in the usual or any suitable manner. The electric conductors entering the box are shown at 6, and these conductors are provided with an armoring 7 of spirally-arranged metallic strip to protect them against injury. The armoring is removed from the end of the conductor which enters the box, preferably for such a distance back from the end that the end of the armoring will bear against the flange 4.

As above pointed out, it is important that the conductor should be firmly secured to the box, so that none of the strains to which the conductor may be subjected while in use will result in pulling the conductor away from the box. For this purpose, I employ a screw 8 passing through a threaded opening formed in the box in such position that the side of the screw will engage the armoring of the conductor. The screw is preferably case-hardened, so that the threads thereof will not be turned over to any considerable extent by the engagement thereof with the armoring of the conductor, but, on the contrary, will cut into the armoring to a small but appreciable extent. The threaded opening in the box for the screw 8 is adjacent to the tubular opening through which the conductor extends, and this threaded opening is so disposed that its axis is slightly inclined to the axis of the tubular opening for the conductor. As a result of this, when the screw is inserted it extends across the conductor, as shown by the dotted lines in Fig. 1, and the side of the screw engages the armoring. Furthermore, the screw is preferably tapered slightly throughout its length, as best shown in Fig. 3, so that as the screw is turned to carry it inwardly it crowds the conductor over in the tubular opening therefor so as to clamp the conductor within that opening by a wedging action.

With a securing device formed as above described, the danger of loosening of the screw under vibration or the wearing away of the screw sufficient to weaken the grip of the securing means upon the conductor is practically eliminated, and the conductor is so firmly clamped to the box that there is practically no danger of its being pulled away from the box.

I have described my invention as employed for securing to a junction-box electric light conductors provided with an armoring of spirally formed sheet-metal strip; it will be understood, however, that the improved securing means is independent of the character of the device secured to the junction-box thereby. Thus, instead of the armored conductors shown, a casing for a conductor, such as a conduit of spirally formed sheet-metal, may be similarly secured to the box, and, therefore, the word "member" in the appended claims is intended to include such a conductor or a conduit or a device of similar character.

Having now described my invention, what I claim as new therein and desire to secure by Letters Patent is as follows:—

1. The combination of a junction-box having an opening therein, a member entering said opening and a screw for securing the member to the box, said screw being tapered and extending through a threaded opening in the box in such position that the side of the screw engages the member, substantially as set forth.

2. The combination of a junction-box having therein an opening for a conductor and a threaded opening adjacent to said opening and inclined relatively thereto, a conductor entering the said opening therefor, and a tapered screw threaded into said threaded opening and having the side thereof engaging and wedging against said conductor, substantially as set forth.

This specification signed and witnessed this 14th day of January, 1910.

EDWIN T. GREENFIELD

Witnesses:
WILLIAM T. RUETE,
CHARLES E. WILSON